(12) United States Patent
Hanyu (10) Patent No.: US 7,153,551 B2
(45) Date of Patent: Dec. 26, 2006

(54) SINGLE-CRYSTALLINE FILM AND PROCESS FOR PRODUCTION THEREOF

(75) Inventor: Yukio Hanyu, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 11/179,600

(22) Filed: Jul. 13, 2005

(65) Prior Publication Data

US 2006/0159863 A1     Jul. 20, 2006

Related U.S. Application Data

(62) Division of application No. 10/681,940, filed on Oct. 10, 2003, now Pat. No. 6,982,104, which is a division of application No. 09/651,244, filed on Aug. 30, 2000, now Pat. No. 6,794,533.

(30) Foreign Application Priority Data

Aug. 31, 1999  (JP) .................................. 11/245703
Aug. 28, 2000  (JP) ............................... 2000/256835

(51) Int. Cl.
   *C30B 29/54*   (2006.01)
   *C09K 19/52*   (2006.01)
   *C09K 19/58*   (2006.01)

(52) U.S. Cl. ....................... 428/1.3; 117/924; 117/925; 428/1.1; 252/299.01; 252/299.3

(58) Field of Classification Search .......... 252/299.01, 252/299.3; 428/1.1, 1.3, 917; 349/924, 349/925; 117/924, 925
See application file for complete search history.

(56) References Cited

U.S. PATENT DOCUMENTS

| 4,639,089 A | 1/1987 | Okada et al. ............... 350/341 |
| 4,892,392 A | 1/1990 | Broer ..................... 350/339 R |
| 5,347,381 A | 9/1994 | Shinomiya et al. ........... 359/78 |
| 5,790,223 A | 8/1998 | Hanyu et al. .............. 349/184 |
| 5,825,447 A | 10/1998 | Hanyu et al. .............. 349/128 |
| 5,835,248 A | 11/1998 | Hanyu et al. ................. 359/76 |
| 5,932,136 A | 8/1999 | Terada et al. .......... 252/299.01 |
| 6,083,574 A | 7/2000 | Asao et al. ................. 428/1.1 |
| 6,128,064 A | 10/2000 | Moriyama et al. ........... 349/173 |
| 6,195,147 B1 | 2/2001 | Asao et al. ................. 349/133 |
| 6,294,229 B1 | 9/2001 | Satoh et al. ................. 428/1.1 |
| 6,794,533 B1 | 9/2004 | Hanyu ......................... 560/73 |
| 6,982,104 B1* | 1/2006 | Hanyu ........................ 428/1.3 |
| 2004/0075082 A1* | 4/2004 | Hanyu ................... 252/299.64 |

FOREIGN PATENT DOCUMENTS

| EP | 0 261 712 | 3/1988 |
| EP | 0 445 629 | 9/1991 |
| JP | 60-114824 | 6/1985 |
| JP | 60-156043 | 8/1985 |
| JP | 61-197496 | 9/1986 |
| JP | 62-036095 | 2/1987 |
| JP | 63-64029 | 3/1988 |
| JP | 03-280013 | 12/1991 |
| JP | 11-101993 | 4/1999 |

OTHER PUBLICATIONS

M. Petrov, et al. "Wall Orientation of Smetic C Liquid Single Crystals," Mol. Cryst. Liq. Cryst., vol. 82, pp. 221-229, 1982.
M. Petrov et al., "Growing of Local Smectic C Monocrystals from an Initially Twisted Nematic Phase", Crystal Res. & Technol., vol. 18, No. 1, pp. 101-106 (1983).
G. Albertini et al., "A Study of the Transistions Smectic A-Hexatic B and Hexatic-Crystal B by X-Ray Diffraction", Mol. Cryst. Liq. Cryst., vol. 104, pp. 121-130 (1984).
O. Butsuri, Appl. Phys., vol. 68, No. 1, pp. 26-32 (1999).
M. Petrov, et al., "Surface Induced Transitions in the Nematic Phase of 4-n Octoyloxybenzoic Acid," Journal of Physics II, France, May 1992, vol. 2, No. 5, pp. 1159-1193.

* cited by examiner

*Primary Examiner*—Shean C Wu
(74) *Attorney, Agent, or Firm*—Fitzpatrick, Cella, Harper & Scinto (57) ABSTRACT

An organic single-crystalline film useful as a functional film in various devices is produced by selecting a liquid crystal material having a good molecular alignment regularity, disposing the liquid crystal material between a pair of boundaries exerting a thickness regulating force and solidifying the liquid crystal material while imparting a molecular alignment order by phase transition from a liquid crystal phase. The liquid crystal material may preferably be a smectic liquid crystal material which provides a uniform molecular alignment inclusive of the direction of the molecular long axis in a smectic phase.

3 Claims, 8 Drawing Sheets

SINGLE-CRYSTALLINE FILM AND PROCESS FOR PRODUCTION THEREOF

This is a division of application Ser. No. 10/681,940 filed Oct. 10, 2003, now U.S. Pat. No. 6,982,104 which is a divisional of application Ser. No. 09/651,244, filed Aug. 30, 2000 now U.S. Pat. No. 6,794,533.

BACKGROUND OF THE INVENTION

The present invention relates to a molecular single-crystalline film (which herein refers to a film having a thickness of at most ca. 100 μm and having a portion which retains a single crystal state having a uniform molecular crystalline alignment over the thickness and over an areal extension including a side length of at least 10 times the thickness, i.e., an areal size useful as a functional film, preferably an areal size of at least 50 μm×50 μm) and a process for the production thereof.

A molecular crystal can be expected to be a useful device material, such as a superconducting material, an effective photoconductor or a gas sensor, because of its electrical and geometrical structure and packing state. As the process for the production thereof, growth in a solution and growth in a molten state have been generally practiced. According to any of such processes, however, it is difficult to obtain a thin film of single crystal by suppressing an increase in thickness, and this poses an obstacle against using it as a functional layer in devices which have a laminar structure in many cases. As another process, there is known a gas phase deposition process, by which, however, it is difficult to prepare a uniform film due to affection by the gas phase deposition boundary.

On the other hand, carrier transportation performance has been reportedly improved by utilizing a molecular alignment in a higher order liquid crystal phase of SmB or SmE (Ohyou Butsuri, Appl. Phys., vol. 68, no. 1, pp. 26–32 (1999)). In this report, a higher speed transportation of electrons and holes has been aimed at by utilization of alignment order in a higher order liquid crystal phase. The improvement in high speed transportation performance has been considered attributable to the formation of flow paths for electrons and holes due to regular packing of aromatic rings in the higher order smectic phase alignment. This performance has been also noted as a carrier transportation layer in EL devices, and further improvement is expected.

Regardless of whether it is a liquid crystal or a (solid) crystal (herein a term "crystal" without further notation is used to mean a solid crystal), the film thereof is required to assume a single crystal state free from defects (i.e., free from carrier traps) in order to function as a functional layer as mentioned above.

Then, if a (solid) single-crystalline film can be obtained, it is expected to achieve a higher speed and higher density carrier transportation because of a higher degree of order and a closer packing of molecules than a liquid crystal film.

SUMMARY OF THE INVENTION

In view of the above-mentioned circumstances, a principal object of the present invention is to provide a molecular single-crystalline film useful in a device and a process for the effective production thereof.

In order to achieve the above-mentioned object, it may be conceived to form a liquid crystal material layer of which the thickness is regulated between a pair of boundaries at a higher temperature and cool the liquid crystal material layer to room temperature, thereby forming a crystal layer wherein the molecular alignment is fixed. As a result of my study, however, such a crystal film obtained through the above-described process, in general, can only form a polycrystalline film and fails to provide a single-crystalline film. This is believed to be due to a strain or disclination in a domain relaxed in a liquid crystal phase because of fluidity or flexibility of the liquid crystal phase, which causes precipitation of crystallites or polycrystallization during crystallization.

As a result of my further study, it has been discovered that a liquid crystal layer of a certain class of liquid crystal having a better regularity formed in a thickness regulated by a pair of boundaries can be phase-transformed into a single-crystalline film while remarkably suppressing polycrystallization.

Based on the above discovery, according to a first aspect of the present invention, there is provided a single-crystalline film having a molecular alignment order provided through phase transition from a liquid crystal phase.

I have also discovered a smectic liquid crystal material exhibiting a uniform (i.e., a single mode of) molecular alignment inclusive of a director (i.e., molecular long-axis) direction in a smectic layer as a suitable material as the above-mentioned liquid crystal material having a better regularity.

Based on the discovery, according to a second aspect of the present invention, there is provided a process for producing a single-crystalline film comprising a step of disposing a smectic liquid crystal material exhibiting a uniform molecular alignment in a smectic layer between a pair of boundaries having a thickness regulation function, and a crystallization step of cooling and solidifying the smectic liquid crystal material through its smectic phase into a single-crystalline film.

A suitable example of such a smectic liquid crystal material is one having a molecular structure, which is symmetrical with respect to its molecular long axis direction. The molecular structure of such a smectic liquid crystal may be represented as a so-called head—head structure, and the mode of molecular lamination alignment thereof in a smectic layer is only one, i.e., cannot be other than stacking of head—head molecules, so that it does not readily result in crystal defects at the time of phase transition into the crystal. In contrast thereto, while many higher temperature smectic liquid crystal materials, i.e., liquid crystal materials having a smectic phase at an elevated temperature, have been known, most of them have a molecular structure which is asymmetrical with respect to the molecular long axis direction and may be represented as a so-called head-tail structure. It is considered that such molecules are stacked in a random manner, inclusive of head-tail, tail-head, . . . , to form a smectic layer, so that many crystal defects are liable to occur at the time of phase transition into crystal, thus providing a polycrystalline film.

These and other objects, features and advantages of the present invention will become more apparent upon a consideration of the following description of the preferred embodiments of the present invention taken in conjunction with the accompanying drawings.

Figure 1:
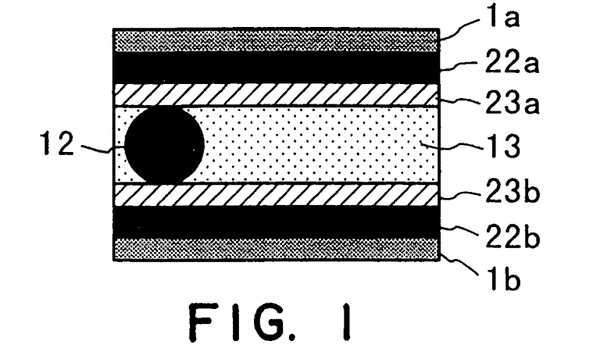
FIG. 1 is a schematic thicknesswise sectional view illustrating a basic structure of a cell used for formation therein of a single-crystalline film according to the invention.

etc., and alignment control films 23a and 23b, respectively, of 50 to 1000 Å-thick polyimide film, etc., disposed opposite to each other with a gap therebetween determined by a spacer 12 disposed therebetween, and a single-crystalline film 13 formed between the substrates. More specifically, for the preparation, a blank cell structure excluding the single-crystalline film 13 may be prepared first similarly as in the preparation of an ordinary liquid crystal cell, a liquid crystal material showing fluidity by heating may be injected into the cell to seal up a liquid crystal layer 13 in the cell, and the liquid crystal layer 13 may be gradually cooled to form a single-crystalline film 13.

As described above, the liquid crystal material constituting the film 13 is required to have a liquid crystal phase having a good regularity. An example thereof is a smectic liquid crystal material providing a uniform molecular alignment in a smectic layer, and a suitable example is a smectic liquid crystal material having a molecular structure which is symmetrical with respect to the molecular long axis. Specific examples thereof may include smectic liquid crystal materials including a material used in the examples described hereinafter and represented by the following general formula (1):

R1-M1-R1  (1), wherein M1 denotes a laterally symmetrical mesogen (i.e., mesomorphic core) unit, and R1 denotes a terminal chain group, such as an alkyl or an alkoxy group suitable for providing a smectic liquid crystal phase. Specific examples of smectic liquid crystal materials represented by formula (1) may include the following compounds:

As described above, an asymmetrical smectic liquid crystal material as represented by formula (2) below:

R2-M2-R3  (2), wherein M2 denotes a mesogen unit, and R2 and R3 denote mutually different terminal chain groups suitable for providing a smectic liquid crystal phase, is not generally suitable for the object of the present invention. However, it is possible to use a kind of smectic liquid crystal material, such as one characterized by, e.g., a combination wherein R2 is an alkyl(oxy) chain, and R3 is a group which is repulsive

DETAILED DESCRIPTION OF THE INVENTION

According to an embodiment, a single-crystalline film according to the present invention may be prepared in a cell structure (device) as illustrated in the schematic sectional view of FIG. 1, which is at a glance similar to that of a conventional liquid crystal cell.

Referring to FIG. 1, the cell structure includes a pair of glass substrates 1a and 1b having thereon transparent electrodes 22a and 22b, respectively, of ITO (indium tin oxide), from R2 and per se shows a strong aggregatability, such as a fluoroalkyl(oxy) chain, in the present invention, because such a smectic liquid crystal material can form a stack of uniformly aligned molecules wherein the groups R2 are directed along one side and the groups R3 are directed along the other side of a smectic layer, thus consequently providing a stack of uniformly aligned molecules R2-M2-R3 in a smectic layer and being less liable to form crystal defects at the time of crystallization.

Figure 2:
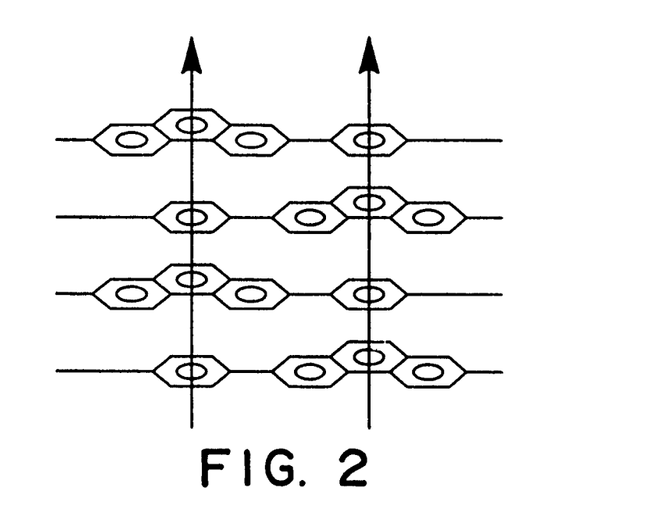
FIG. 2 illustrates a deviation in alignment of aromatic rings in a random stacking of head-tail molecules.
Figure 3:
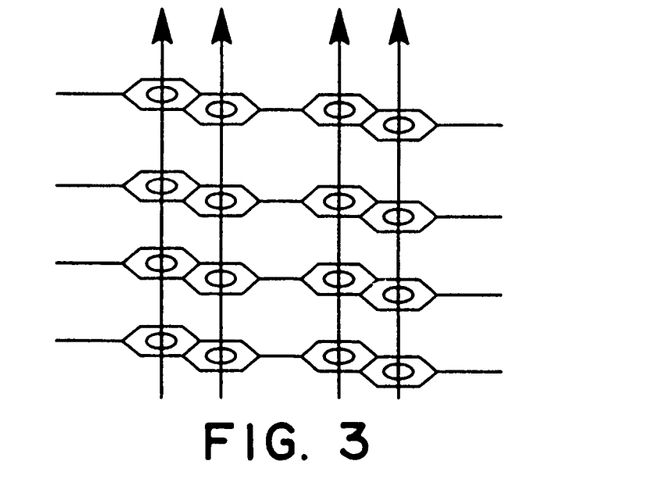
FIG. 3 illustrates a better overlapping of aromatic rings in a stacking of head—head molecules.

A liquid crystal material having a uniform molecular alignment in a smectic layer advantageously affects the properties of the resultant single-crystalline film. More specifically, in the case of an alignment wherein a head-tail molecule and a tail-head molecule are stacked at random, the resultant single-crystalline film, even if formed as such, is caused to include a shift of aromatic rings constituting the liquid crystal material as shown in FIG. 2. In contrast thereto, in a single-crystalline film formed by the stacking of molecules having a symmetrical structure, such as head—head, it becomes possible to obtain better electrical and optical properties attributable to overlapping of π-electrons as illustrated in FIG. 3.

As the single-crystalline film of the present invention is provided with a molecular alignment order through phase transition from a liquid crystal phase, it is preferred that the liquid crystal material used in the present invention has at least one liquid crystal phase at a higher temperature region than room temperature and is cooled to provide a stable crystal film at room temperature. It is further preferred that the liquid crystal material used has two or more liquid crystal phases and is caused to enhance the alignment order in the course of cooling from a lower order of liquid crystal phase to a higher order of liquid crystal phase and be crystallized into a single-crystalline film as a result of a further higher degree of order. A preferred example of phase transition series to be assumed by the liquid crystal material may include the following:

Cryst-SmC-N-Iso.

The single-crystalline film 13 may have a thickness which can be arbitrarily set within a range of, e.g., 100 nm–100 μm, preferably ca. 1–10 μm, depending on the function of the film in the device including the film.

The cooling speed for formation of the single-crystalline film may preferably be at most 10° C./min, more preferably at most 5° C./min, particularly preferably ca. 1–3° C./min, while it can depend on the thickness of the film formed.

By selection of an appropriate liquid crystal material, the single-crystalline film 13 can be formed through a single course of cooling from such a liquid crystal phase (as shown in Example 1 described hereinafter). However, in order to obtain a single-crystalline film having a better crystallinity and/or including a broader area of single crystal, it is also preferred to include an operation of re-heating a once-formed single-crystalline film again to a crystal region temperature which is close to the liquid crystal—crystal transition temperature, preferably in a range of the transition temperature −10° C., more preferably in a range of the transition temperature −3° C. and holding the film at that temperature for a prescribed period of ca. 0.5–5 hours. As a result of such an operation, it becomes possible to convert a polycrystalline region remaining in the once-formed single-crystalline film or cause the once-formed single crystal region to grow into a broader region. Incidentally, the holding at a crystalline region temperature in the vicinity of the liquid crystal—crystal phase transition temperature can be performed immediately after transition from the liquid crystal phase to the crystal phase, without once cooling to room temperature (as shown in Example 2 described later). In any case, it is possible to obtain a single-crystalline film having a better single crystallinity by cooling to room temperature after the holding.

In the embodiment of FIG. 1, the thickness of the film 13 is regulated by the bead spacer 12. It has been confirmed that the presence of such bead spacer 12 does not adversely affect the single crystallinity of the resultant film 13 up to ca. 20 μm of the thickness. While it depends on the area of the film 13, in order to form a thickener film, the bead spacer can be omitted or replaced by a stripe spacer.

Incidentally, as will be understood from the examples described later, the transparent electrodes 22a and 22b are unnecessary simply for the purpose of formation of a single-crystalline film, but the crystallization can be performed under application of a voltage as desired. Further, at least in the case of using a smectic liquid crystal material having a symmetrical molecular structure as represented by the above-mentioned formula (1) and used in the following examples, the presence or absence of alignment films 23a and 23b, or the presence or absence of a uniaxial aligning treatment, such as rubbing, for the alignment films 23a and 23b, does not essentially affect the formation of a single-crystalline film 13. Accordingly, such alignment films 23a and 23b can be omitted, as desired. Thus, the surfaces of a pair of substrates 1a and 1b contacting the liquid crystal layer 13 injected into the cell can essentially comprise any arbitrary material capable of providing a pair of boundaries for converting the liquid crystal layer 13 into a single crystal while maintaining the thickness of the liquid crystal layer 13 constant.

However, depending on the liquid crystal material used, it is possible to positively utilize the alignment control force of a boundary for aligning liquid crystal molecules perpendicular to, parallel to, or inclined at a desired inclination to the boundary and utilize the alignment order for formation of a single-crystalline film in the crystal phase of a higher degree of order.

As is understood from the above description, a substantial latitude is left regarding the materials constituting a pair of boundaries contacting the liquid crystal layer 13. Accordingly, in the case of using the single-crystalline film 13 in the above embodiment, e.g., as a hole-transporting layer in an EL device, similar to a liquid crystal film described in the above-mentioned document (Ohyou Butsuri, Appl. Phys., vol. 68, no. 1, pp. 26–32 (1999)), the ITO 22a, 22b and the alignment films 23a, 23b can be replaced by functional layers including a pair of EL device electrodes and an EL luminescent layer. Such an EL device of a closed structure including a single-crystalline film of the present invention is remarkably preferable in view of, e.g., low moisture resistance of EL-luminescent materials.

Further, as another example of an application utilizing a broad latitude of structural materials for providing the boundaries, it is possible to provide a cell including flexible substrates. More specifically, by utilizing a pair of flexible polymer films for the substrates 1a and 1b in the device having the organization shown in FIG. 1, it is possible to form a single-crystalline film device which is flexible as a whole. A pair of such polymer films sandwiching a liquid crystal material may be readily formed into a cell by heat-sealing the polymer films. The resultant film device may be disposed along an arbitrarily curved surface of a substrate, e.g., by application thereof over the entirety or a part of the circumference of a cylindrical surface or on a substrate surface having an arbitrary curvature. Such a substrate having a curved surface may preferably be composed of, e.g., a metal having a good thermal conductivity. As a result, a film device once disposed on a curved surface of a substrate may be elevated to an appropriate crystallization temperature, held for a prescribed period at that temperature and then gradually cooled to room temperature, whereby the film in the film device can be converted into a single-crystalline film which per se is in the curved state, thus providing a curved single-crystalline film device.

As is shown in the above-described embodiments, a film formed in situ and incorporated in a cell structure is a preferred embodiment of the single-crystalline film according to the present invention. Depending on a required function thereof, however, such a single-crystalline film according to the present invention formed in situ in a cell structure can be used in a form isolated from such a cell structure or in a form laminated with another functional layer by transferring from such a cell structure.

EXAMPLES

Hereinbelow, the present invention will be described more specifically based on examples.

Example 1

A cell having a layer structure schematically illustrated in FIG. 1 was prepared.

Two glass sheets each having a thickness of 1.1 mm and an areal size of ca. 20 mm×20 mm were respectively coated with a 700 Å-thick ITO transparent conductor film by sputtering and further with a 0.7 wt. % solution in NMP (N-methylpyrrolidone) of a polyamic acid ("LP-64", made by Toray K. K.) having a recurring unit of formula (3) below by spin coating at 2000 rpm for 20 seconds:

(3)

followed by pre-drying at 80° C. for 5 minutes and baking at 200° C. for 60 minutes to form a 50 Å-thick film of polyimide represented by formula (4) below:

(4)

The polyimide film on each glass substrate was subjected four times to rubbing in one direction with a nylon-planted cloth at a roller feed speed of 10 mm/sec and a roller revolution speed of 1000 rpm.

The two substrates treated in the above-described manner were applied to each other with 2.4 μm-diameter spacer beads disposed therebetween at a density of 200 beads/mm² to form a blank cell having a cell gap of ca. 2.0 μm. Then, a liquid crystal material having a structure of formula (5) and a phase transition series respectively shown below was injected into and sealed up within the cell at a nematic phase temperature (130° C.) to form a sample cell, which was then cooled to room temperature at a rate of 1° C./min, thereby crystallizing the liquid crystal material within the cell to form a crystalline film.

(5)

$$\text{Cryst.} \xrightarrow{122} \text{SmC} \xrightarrow{126} \text{N} \xrightarrow{194} \text{Iso}$$

Figure 4:
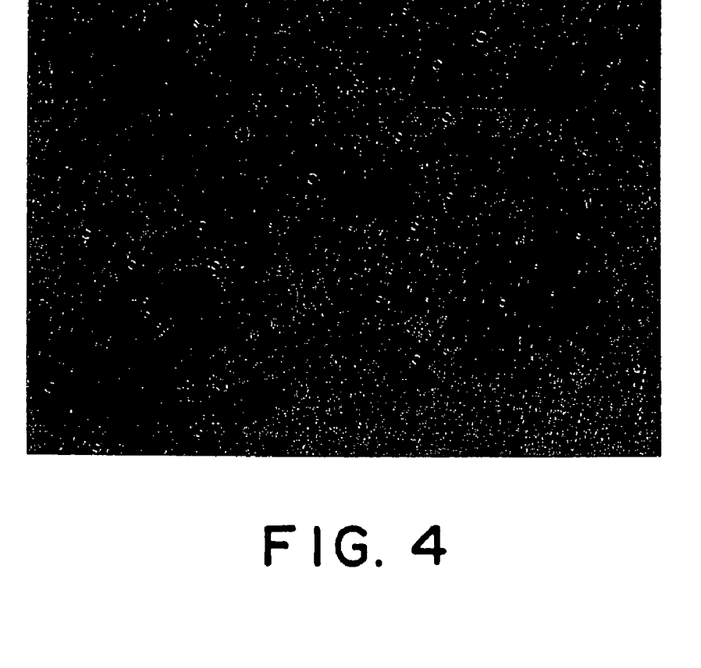
FIG. 4 is a polarization microscope photograph (x100) of nematic phase (130° C.) in a cell of Example 1.

In the meantime, the alignment state of the liquid crystal material was observed and photographed through a polarizing microscope in a nematic phase (at 130° C.), a smectic phase (at 123° C.) and in a crystal phase (at 30° C.). The thus-obtained photographs (each at a magnification of 100) are respectively attached hereto as FIG. 4 (nematic phase), FIG. 5 (smectic phase) and FIG. 6 (crystal phase). Further, a schematic view based on a sketch of the photograph of FIG. 6 is attached hereto as FIG. 9.

Figure 5:
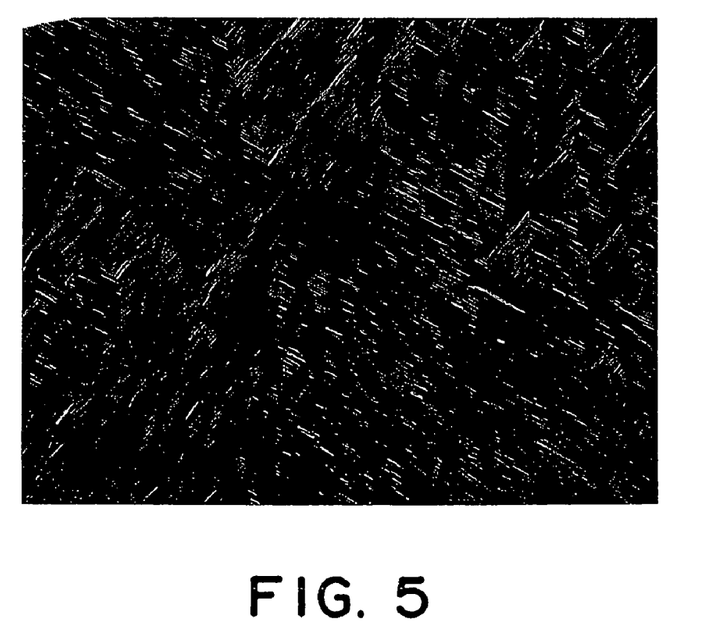
FIG. 5 is a polarization microscope photograph of smectic C phase (123° C.) in the cell of Example 1.
Figure 6:
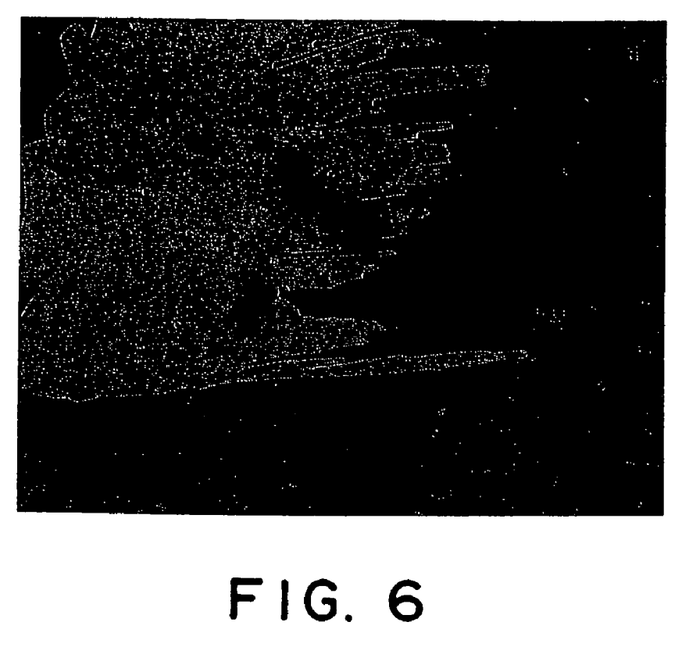
FIG. 6 is a polarization microscope photograph of crystal phase (30° C.) in the cell of Example 1.
Figure 9:
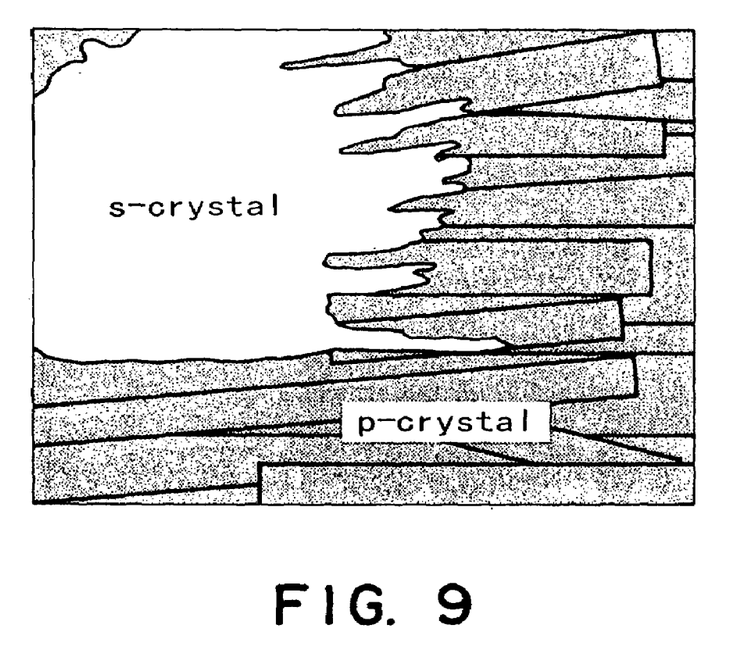
FIG. 9 is a schematic view based on a sketch of the photograph of FIG. 6.

In the photograph of FIG. 5, two-direction domains peculiar to nematic-SmC transition and showing therein microdomains, due to slightly different layer directions as an indication of alignment uniformity therein, are observed. In the photograph of FIG. 6, as indicated in FIG. 9 which is a schematic view based on a sketch thereof, a single crystal (s-crystal) region developed to an area of ca. 0.5 mm², which is sufficiently large for use as a single crystal functional film, is recognized in a left half, while a polycrystal (p-crystal) region remains in a right half (i.e., crystal state of 50% uniform alignment), thus showing that a single-crystalline film of the present invention was obtained. Further, it was confirmed by observation through a polarizing microscope that the single crystal region (in the left of FIG. 6) showed an optical uniformity, which was remarkably improved as compared with the 5 mC alignment (as shown in FIG. 5).

Example 1A

In order to examine the crystalline order of the respective regions in the crystalline film obtained in Example 1, a cell for x-ray diffraction analysis was prepared in the same manner as in Example 1 except 80 μm-thick glass substrates were used.

Figure 10:
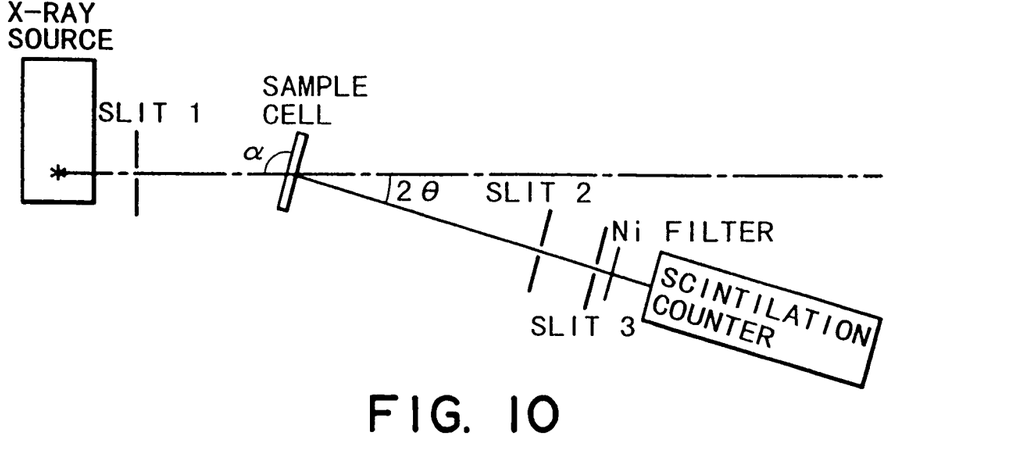
FIG. 10 illustrates an outline of an x-ray diffraction apparatus for examining the crystallinity of a film in a sample cell.

The cell was set in a rotary pair cathode-type x-ray diffraction apparatus ("RU-300", made by Rigaku Denki K. K.) having an organization as illustrated in FIG. 10 to obtain x-ray diffraction patterns for the single crystal region (s-crystal) and polycrystal region (p-crystal), respectively, in FIG. 6 by a transmission method under the following conditions:

X-ray source:
CuKa, 40 kV, 200 mA
Measurement conditions:
    Effective line focus width=0.05 mm
    S1=0.15 mm, S2=SS2 deg., S3=0.3 mm,
    Ni filter Focus-S1=95 mm, S1-Sample=90 mm,
Sample-S2=143 mm, S2-S3=42 mm
Incident angle (α deg.)=fixed
2θ-scan 1 deg./min., Interval=0.02 deg.
Angle resolution=ca. 3.5 rad (=ca. 0.2 deg.)
Sample cell x-ray irradiation region
  width=0.3 mm, length=ca. 10 mm.

Figure 11:
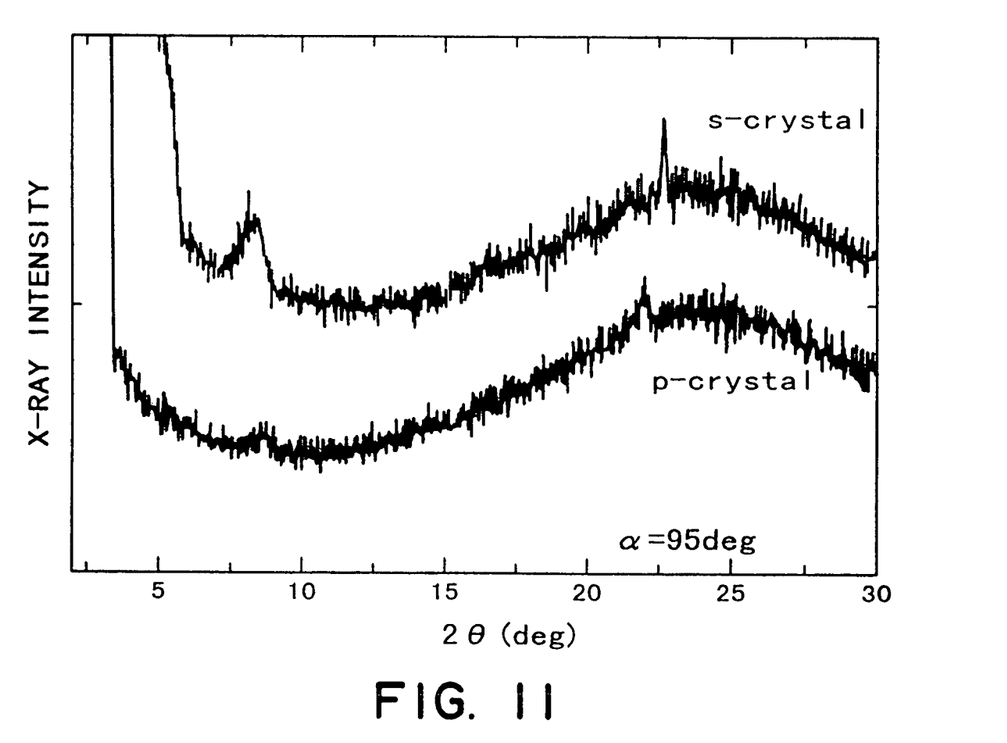
FIG. 11 is a graph showing x-ray diffraction patterns (at an x-ray incidence angle α=95 degrees) of a single crystal portion (s-crystal) and a polycrystal portion (p-crystal), respectively, in a cell of Example 1A.

X-ray diffraction patterns obtained at a fixed incident angle α=95 degrees for the single crystal region (s-crystal) and polycrystal region (p-crystal) are shown in parallel in FIG. 11. As shown in FIG. 11, two diffraction peaks each were observed at 2θ=8.5 degrees (d=10.4 Å) and 2θ=22.66 degrees (d=3.92 Å) for the single crystal region, and at 2θ=8.8 degrees (d=10.0 Å) and 2θ=22.66 degrees (d=4.04 Å) for the polycrystal region.

Figure 12:
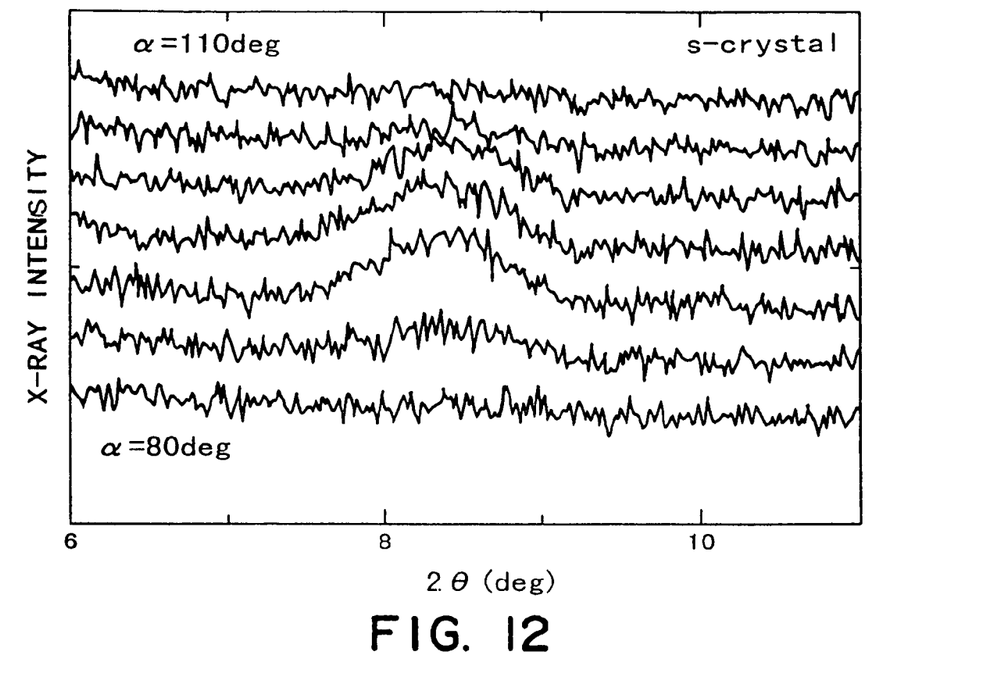
FIGS. 12 and 13 are graphs showing changes of x-ray diffraction patterns with variation of incidence angles (α=80–110 degrees) of the single crystal portion (s-crystal) and polycrystal portion (p crystal), respectively, in the cell of Example 1A.
Figure 13:
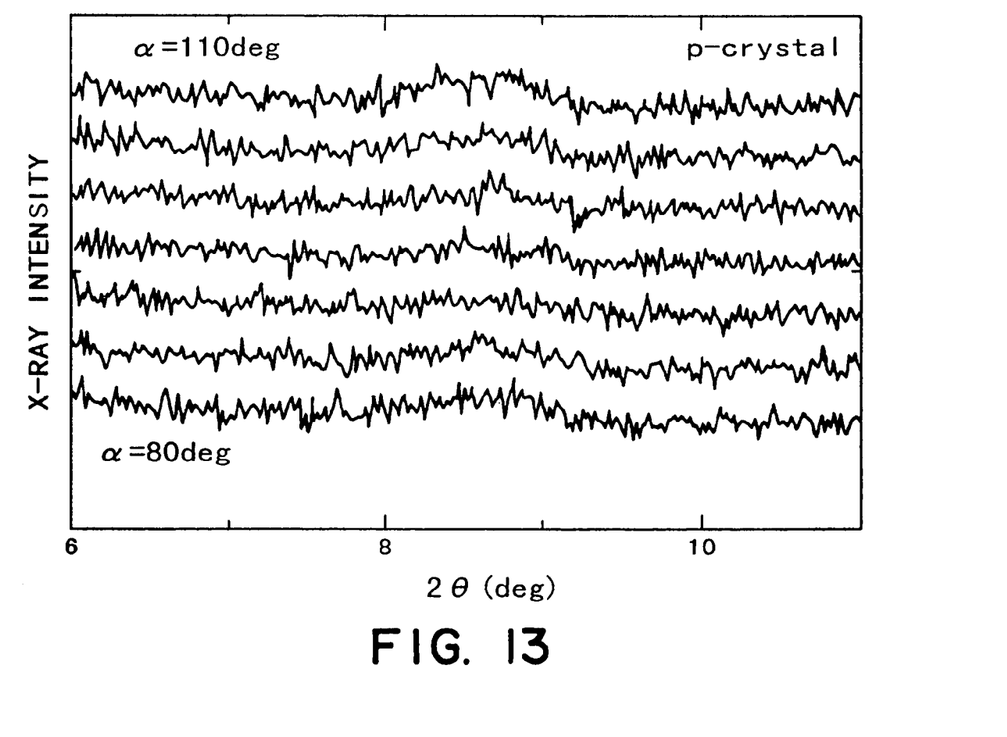

Then, the x-ray incidence angle was varied at an increment of 5 degrees in the range of 80–110 degrees, and diffraction patterns obtained in the neighborhood of lower angle side peaks (θ=8.5 degrees and 8.8 degrees) are inclusively shown in FIGS. 12 and 13 for the single crystal region and the polycrystal region, respectively. According to FIG. 12, the single crystal region exhibits a maximum peak intensity in the neighborhood of α=95 degrees and exhibits substantially no observable peak at α=80 degrees or 110 degrees. In contrast thereto, the polycrystal region shown in FIG. 13 generally exhibits a lower peak intensity than the single crystal region and substantially no dependence on the incidence angle change. These results indicate that the single crystal region exhibits an anisotropy for x-ray diffraction and a higher order of molecular crystalline alignment, whereas the polycrystal region exhibits substantially no anisotropy for x-ray diffraction.

Example 2

The cell prepared in Example 1 was again heated to a nematic phase temperature (130° C.) and thereafter started to be cooled at a rate of 1° C./min, similar to Example 1. In this example, however, the cell was not continually cooled to room temperature as in Example 1, but held for 30 minutes at 118° C. which was a crystal phase temperature lower than the SmC-crystal transition temperature (=122° C.) and thereafter cooled to room temperature. In the meantime, the alignment states were photographed through a polarizing microscope after holding for 1 minute and 10 minutes, respectively, at 118° C. The thus-obtained photographs (each in a magnification of 100) are attached hereto as FIGS. 7 and 8, respectively.

Figure 7:
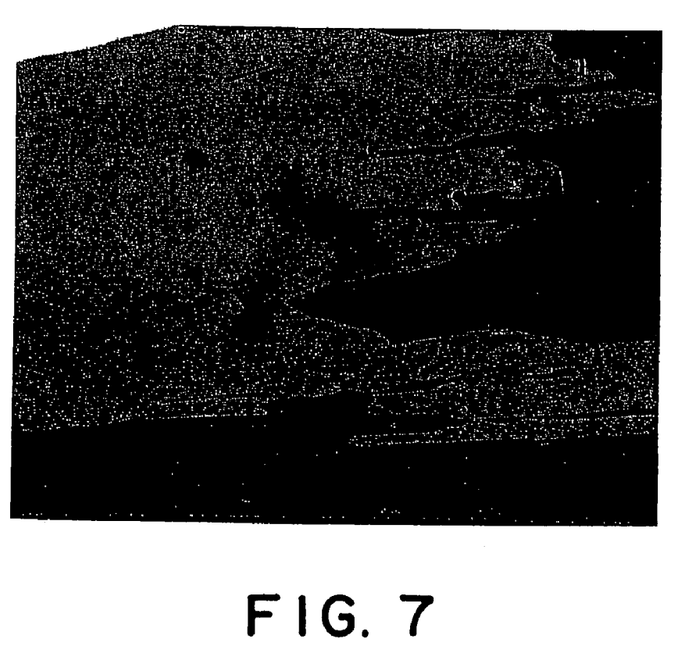
FIGS. 7 and 8 are polarization microscope photographs of states after 1 minute and 10 minutes, respectively, held at 118° C. in a cell of Example 2.
Figure 8:
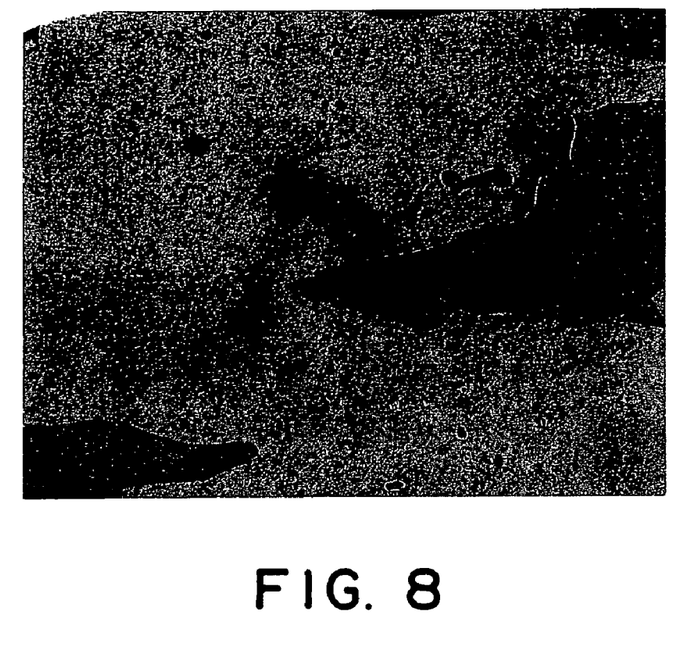

With the lapse of time of the holding at 118° C., the single crystal region was remarkably enlarged to ca. 80% of the cell area (20 mm×20 mm) as shown in FIG. 7 after holding for 1 minute, which already exceeded the single crystal region percentage (ca. 50%) shown in FIG. 6 (obtained by holding for ca. 1.5 hours at crystal region temperatures in Example 1). Then, as shown in FIG. 8, the entire region (100%) of the cell area was recognized to be single-crystallized. Incidentally, FIG. 8 shows two types of regions of white and black. It was confirmed that these two types of regions were respectively single crystal regions (domains) which had different planar director directions of bar-shaped molecules and an identical thicknesswise alignment in both regions. The cell obtained after holding for 30 minutes at 118° C. and then cooled to room temperature, was found to retain the single-crystalline film state shown in FIG. 8.

Example 2A

Figure 14:
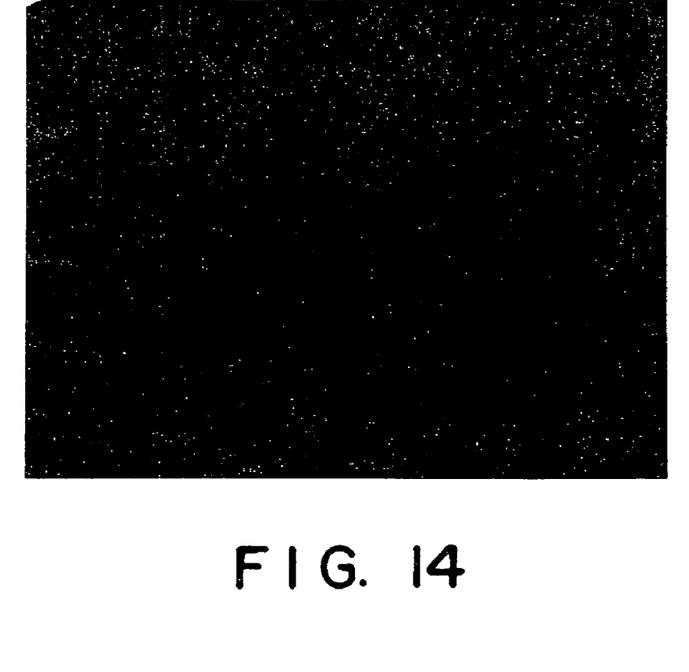
FIG. 14 is a polarizing microscope photograph (x150) showing the crystallinity of a film in a cell of Example 2A.

In order to confirm the single crystallinity of the film, an impact was applied to the cell of Example 2 after cooling to room temperature. As a result, the crystalline film was cleaved presumably also due to a volume shrinkage during the cooling. FIG. 14 is a polarizing microscope photograph (×150) showing the state. FIG. 14 shows cleavage lines that extend in only three directions, and this indicates that the crystalline film had a high degree of long distance order and was a single crystal film.

Example 3

The cell of Example 2A was again heated to a nematic phase temperature (130° C.) and thereafter cooled at a rate of 1° C./min to room temperature. In the meantime, the alignment states in the nematic phase (130° C.), smectic phase (123° C.) and crystal phase (30° C.) were observed through a polarizing microscope and found to be substantially similar to those shown in FIGS. 4, 5 and 6, respectively.

Example 4

The cell of Example 3 was now heated up to 118° C. at a rate of 1° C./min and was held at that temperature for 30 minutes, similar to Example 2, followed by cooling to room temperature at a rate of 1° C./min. In the meantime, the alignment states were observed through a polarizing microscope after the holding for 1 minute and 10 minutes respectively at 118° C. and were found to be substantially similar to those shown in FIGS. 7 and 8, respectively. It was also confirmed that the cell cooled to room temperature retained the single-crystalline film state formed after holding at 118° C. for 30 minutes. Thus, in the cell, a polycrystal region as shown in a right half of FIG. 6 formed in the cell of Example 6 was transformed into a single crystal region as shown in a right half of FIG. 8.

Example 5

A blank cell was prepared in a similar manner as in Example 1 except a pair of 100 μm-thick polymer film substrates were used. A sample cell was prepared by injecting the liquid crystal material of formula (5) in a nematic phase and cooling to room temperature in a similar manner as in Example 1.

Figure 15:
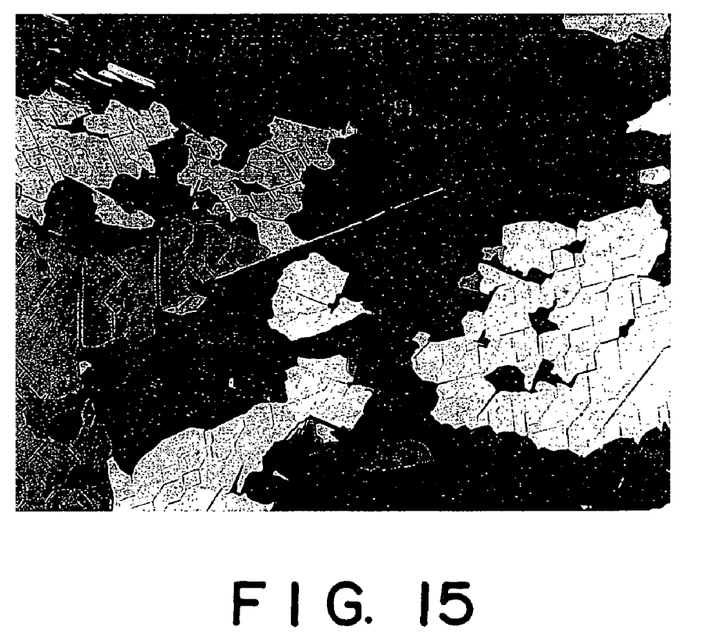
FIG. 15 is a polarizing microscope photograph (x75) showing the crystallinity of a film in a cell of Example 5.

Thereafter, the cell was again heated to 118° C. and held at that temperature for 30 minutes. With the lapse of the holding time, the single crystal region was observed to be enlarged until 30 minutes thereafter, wherein a single-crystalline film state was enlarged over the entire cell area of 20 mm×20 mm. After cooling to room temperature at a rate of 1° C./min, the film in the cell exhibited a single-crystalline film state including single crystals of 0.2–1 mm, as shown in the polarizing microscopic photograph (×75) of FIG. 15. The resultant flexible cell was applied in a curved form along a part of the circumference of a metal cylinder 10 mm in diameter, and then again subjected to the above-mentioned cycle of heating to 118° C., holding at that temperature and cooling to room temperature, whereby the curved film in the flexible cell applied about the metal cylinder exhibited a single-crystalline film state substantially similar to the one shown in FIG. 15.

As described above, according to the present invention, an organic single-crystalline film having a molecular alignment order provided through phase transition from a liquid crystal phase was achieved using an appropriately selected liquid crystal material and cooling and solidifying the liquid crystal material while utilizing a thickness regulating force exerted on the liquid crystal material from a pair of boundaries. Thus, it is possible to obtain a functional single-crystalline film which can be utilized in various devices.

What is claimed is:

1. A carrier transporting film disposed between a pair of conductive boundaries, said carrier transporting film comprising a single crystal of a liquid crystal material in a solid crystal phase;
   wherein the liquid crystal material exhibits a smectic liquid crystal phase at a higher temperature than a temperature range of the solid crystal phase,
   wherein a carrier transport function is enhanced by a molecular alignment order provided through phase transition from the smectic liquid crystal phase to the solid crystal phase, and
   wherein the molecular structure of the liquid crystal material is represented by Formula (1):

$$R1\text{-}M1\text{-}R1 \quad (1),$$

wherein M1 denotes a laterally symmetrical mesogen unit including an aromatic ring and R1 denotes an alkyl or an alkoxy group.

2. A carrier transporting film according to claim 1, wherein the carrier is an electron or a hole to be transported through the aromatic ring of each molecule.

3. A single crystalline carrier transporting film disposed between a pair of conductive boundaries said carrier transporting film comprising a liquid crystal material in a solid crystal phase;
   wherein the liquid crystal material exhibits a smectic liquid crystal phase at a temperature above the solid crystal phase, and
   wherein a carrier transport function is caused by a molecular alignment order provided through phase transition from the smectic liquid crystal phase to the solid crystal phase wherein the carrier transporting film is a hole-transporting layer in an electroluminescent device.

* * * * *

UNITED STATES PATENT AND TRADEMARK OFFICE
CERTIFICATE OF CORRECTION

| | | |
|---|---|---|
| PATENT NO. | : 7,153,551 B2 | Page 1 of 1 |
| APPLICATION NO. | : 11/179600 | |
| DATED | : December 26, 2006 | |
| INVENTOR(S) | : Yukio Hanyu | |

It is certified that error appears in the above-identified patent and that said Letters Patent is hereby corrected as shown below:

ON THE TITLE PAGE

At Item (30), under Foreign Application Priority Data, "11/245703" should read --11-245703--.

COLUMN 8

Line 46, "5 mC" should read --SmC--.

Line 63, "CuKa" should read --CuKα--.

Signed and Sealed this

Eighteenth Day of March, 2008

JON W. DUDAS
*Director of the United States Patent and Trademark Office*